United States Patent [19]

Batlivala et al.

[11] Patent Number: 4,475,246
[45] Date of Patent: Oct. 2, 1984

[54] SIMULCAST SAME FREQUENCY REPEATER SYSTEM

[75] Inventors: Percy P. Batlivala, Arlington Heights; Richard S. Kommrusch, Schaumburg, both of Ill.

[73] Assignee: Motorola, Inc., Schaumburg, Ill.

[21] Appl. No.: 451,676

[22] Filed: Dec. 21, 1982

[51] Int. Cl.³ .............................................. H04B 7/14
[52] U.S. Cl. ...................................... 455/18; 455/22; 455/24; 455/51
[58] Field of Search ....................... 455/15, 18, 20, 22, 455/24, 50, 51, 60, 63, 276, 278, 283, 284, 78; 370/32

[56] References Cited

U.S. PATENT DOCUMENTS

| | | |
|---|---|---|
| 3,681,695 | 8/1972 | Cease et al. |
| 3,696,429 | 10/1972 | Tressa ........................ 455/79 |
| 3,938,153 | 2/1976 | Lewis et al. |
| 3,938,154 | 2/1976 | Lewis |
| 3,978,483 | 8/1976 | Lewis et al. |
| 4,075,566 | 2/1978 | D'Arcangelis ................ 455/284 |
| 4,255,814 | 3/1981 | Osborn ........................ 455/51 |
| 4,317,217 | 2/1982 | Davidson et al. ............. 455/22 |
| 4,363,129 | 12/1982 | Cohn et al. ................... 455/22 |

FOREIGN PATENT DOCUMENTS 2065421 6/1979 United Kingdom .

Primary Examiner—Jin F. Ng
Attorney, Agent, or Firm—Charles L. Warren; James W. Gillman; Edward M. Roney

[57] ABSTRACT

The simulcast communication system includes a transmitting station for transmitting a first signal at a given frequency and a same frequency repeater (SFR) having a receiver for receiving the first signal and a transmitter for retransmitting the received signal at the same given frequency. The SFR rebroadcasts the received signal with a time delay of T. The receiver of the SFR receives the retransmitted signal as a spillover signal. A mechanism is coupled to the transmitting station for generating a second signal which consists of the first signal delayed in time by T1 which is approximately equal to T. Another mechanism coupled to the SFR substantially cancels the spillover signal and the second signal since the second signal is in phase with the spillover signal. Thus, the signal retransmitted by the SFR differs in phase from the second signal transmitted by the transmitting station only by the propagation delay between the SFR and the transmitting station, whereby the likelihood that a mobile unit will experience simulcast distortion due to the reception of the second signal and the retransmitted signal can be minimized. This invention further contemplates that multiple SFR's may be employed wherein each SFR includes a mechanism for cancelling any other retransmitted signals by other SFR's as received at each SFR.

15 Claims, 4 Drawing Figures

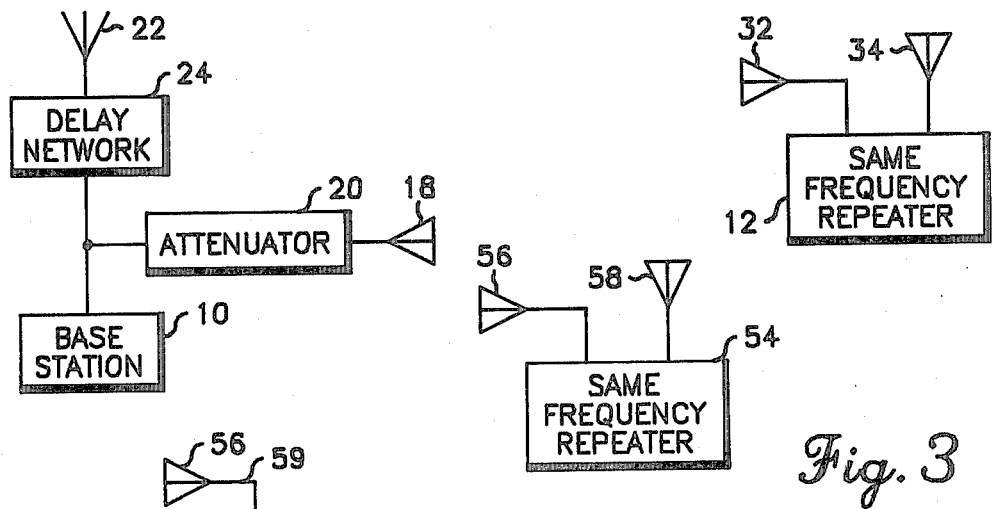
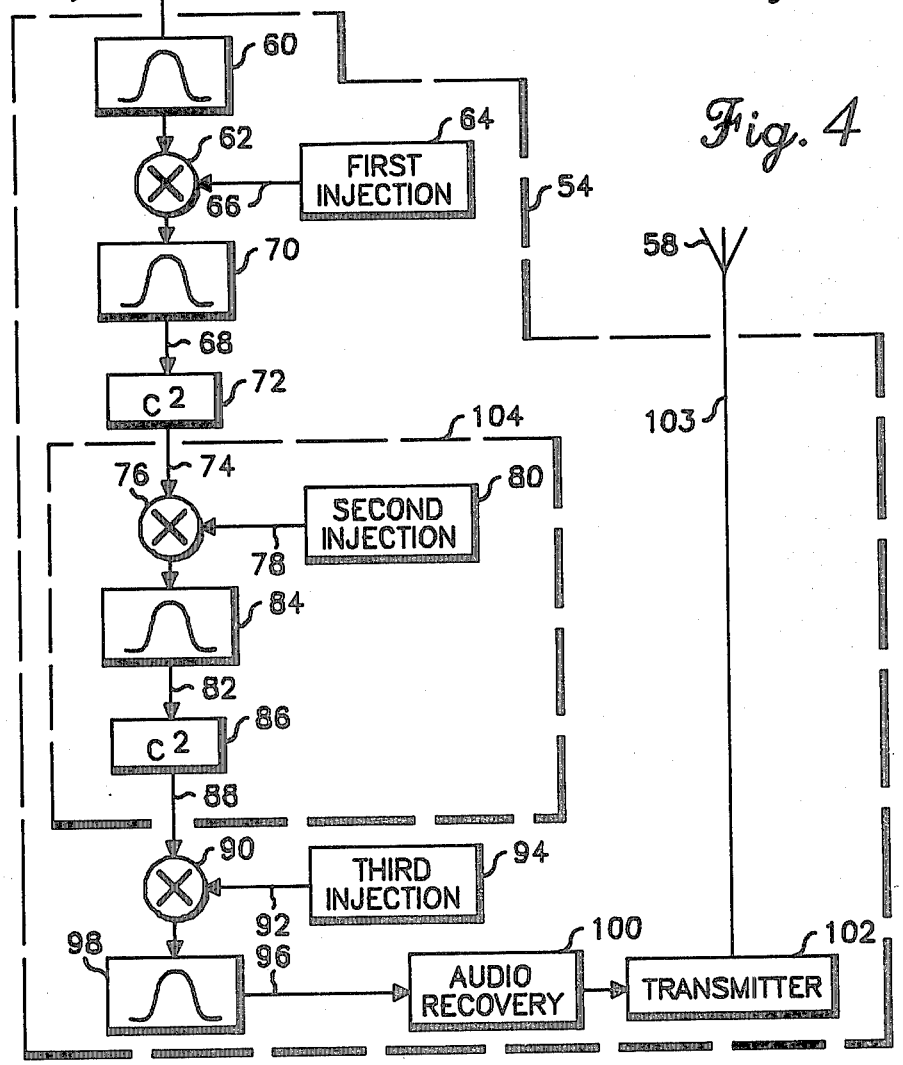
Fig. 3
Fig. 4

SIMULCAST SAME FREQUENCY REPEATER SYSTEM

BACKGROUND OF THE INVENTION

This invention relates to an RF communication system utilizing one or more same frequency repeaters (SFR's) to simultaneously rebroadcast a signal received from a base station thereby extending the area in which the signal can be received by mobile or portable units. More specifically, this invention seeks to minimize the problem of simulcast distortion in such a system. Simulcast distortion refers to interference caused by the reception of first and second signals having approximately equal amplitudes and carrying the same information where the first signal is delayed in time by 100 microseconds or longer relative to the second signal.

An SFR includes a receiver for receiving a signal at a given frequency and a transmitter for retransmitting the signal at the same frequency. Due to the inherent time delays in receiving, processing, and retransmitting a signal, the retransmitted signal broadcast from the SFR is delayed in time relative to the received signal in the order of 100 microseconds or more. Thus, the possibility exists for a mobile unit to experience simulcast distortion as a result of receiving a signal directly from the base station and another signal from an SFR which consists of the base station signal delayed in time.

The problem of simulcast distortion is further complicated when two or more SFR's are utilized to simultaneously retransmit a signal received from a base station. The additional complexity arises because a certain SFR may receive the time delayed signal transmitted by another SFR in addition to the signal from the base station.

The certain SFR will rebroadcast both received signals if they are received at approximately the same signal strength. Thus, a mobile unit which receives the signals retransmitted by the certain SFR may experience simulcast distortion due to the time or phase difference between these retransmitted signals.

It is a general object of this invention to minimize the simulcast distortion problems mentioned above.

PRIOR ART

U.S. Pat. No. 4,255,814 entitled "Simucast Transmission System" deals with the problem of simulcast distortion in a microwave transmission system in which the audio for remotely located VHF transmitters are carried on separate microwave channels. An electronic storage circuit supplies the required time delay for each audio channel to achieve phase coherency of the signals transmitted at the remote sites.

A multipath compensation system is disclosed in U.S. Pat. No. 3,681,695 wherein received signals carrying the same information but with random phase relationships are processed to achieve coherent phase relationships to deliver maximum signal power to a load. A selectable delay is associated with each received signal for controlling the phase relationships.

Various types of apparatus have been utilized in an attempt to cancel an interfering or undesired signal having the same frequency as a desired signal. In U.S. Pat. Nos. 3,938,153; 3,138,154 and 3,978,483 correlation and cancellation circuits, commonly referred to as $C^2$ circuits, are employed in a radar system to cancel signals received by side lobes of the primary antenna. The use of such $C^2$ circuits to provide cancellation of the spillover signal in an SFR is disclosed in United Kingdom patent application GB2 Pat. No. 065,421, filed on June 8, 1979 and published June 24, 1981. Concurrently filed U.S. patent application Ser. No. 451,984 entitled "Improved Isolation Method and Apparatus for a Same Frequency Repeater" and assigned to the assignee of this invention discloses an apparatus for cancelling the spillover signal in an SFR.

SUMMARY OF THE INVENTION

It is an object of this invention to minimize the likelihood of simulcast distortion occurring in a simulcast communication system wherein an SFR is utilized to rebroadcast a received signal.

Another object of this invention is to provide a simulcast communication system including a base station for transmitting a first signal to the SFR and a second signal to the mobile units wherein the second signal consists of the first signal delayed for a time period equal to the rebroadcast delay of the SFR.

In addition to the above objects, it is a still further object to time delay the second signal broadcast by the base station such that it arrives at the SFR substantially in phase with the SFR spillover signal (the rebroadcast SFR signal received by the same SFR receiver) whereby a cancellation circuit in the SFR for cancelling the spillover signal also provides substantial cancellation of the second signal.

This invention further contemplates the use of two or more SFR's in a simulcast communication system wherein the SFR's have equal rebroadcast time delays. Perferably each SFR includes a cancellaton circuit means capable of cancelling out-of-phase signals received from other SFR's in addition to cancelling the spillover signal and the delayed second signal broadcast by the base station.

An embodiment of the present invention includes a base or transmitting station for transmitting a first signal at a given frequency and an SFR for receiving the first signal and retransmitting the received signal at the same given frequency. The SFR has a time delay of T seconds such that the retransmitted signal consists of the received signal delayed in time by T seconds. The retransmitted signal as received by the SFR defines a spillover signal. The transmitting station includes means for transmitting a second signal consisting of the first signal delayed in time by approximately T seconds. The SFR includes means for substantially cancelling the spillover signal such that the second signal and the spillover signal are each cancelled by the SFR since a coherent phase relationship exists between same.

In order to minimize simulcast distortion in a multiple SFR system wherein an SFR may receive a signal rebroadcast by another SFR, each such SFR includes further cancellation means for cancelling the received signal or signals from other SFR's. Such cancellation is attainable since each signal received from another SFR consists of the desired received signal arriving at a different phase.

BRIEF DESCRIPTION OF THE DRAWINGS

FIG. 3 is a diagram illustrating an alternative embodiment of a system according to the present invention.

FIG. 4 is a block diagram of an alternative embodiment of an SFR in accordance with the present invention.

DETAILED DESCRIPTION

Figure 1:
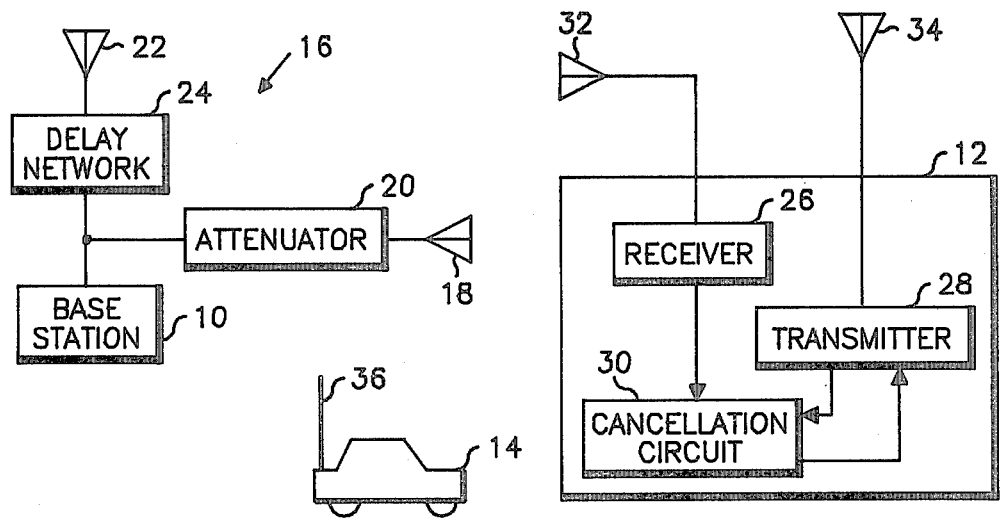
FIG. 1 is a diagram illustrating an embodiment of a system according to the present invention.
Figure 2:
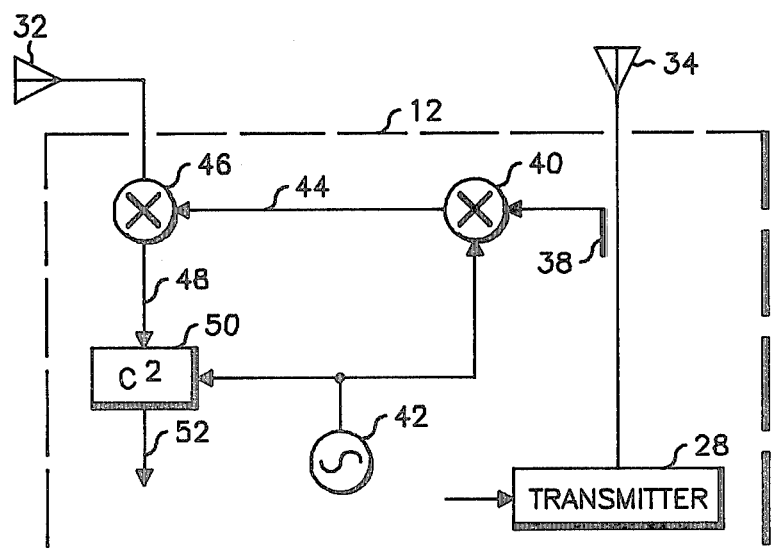
FIG. 2 is a partial block diagram of an embodiment of an SFR according to the present invention.

FIG. 1 illustrates a simulcast communication system according to the present invention having a base station 10, a same frequency repeater (SFR) 12 for rebroadcasting a signal received from the base station, and a mobile unit 14 which is representative of mobile or portable units having a receiver for receiving the signal. The purpose of the SFR is to extend the "talk-out" range of the base station 10, that is, extend the geographic area in which mobile unit 14 remains in communication with the base station.

The base station 10 includes an antenna means 16 which enables the base station to simultaneously broadcast a first and second signal. The antenna means may include a horizontally polarized antenna 18 for transmitting a first signal attenuated by attenuator 20 to the SFR, and a vertically polarized omnidirectional antenna 22 for transmitting a second signal to the mobile unit. The second signal has the same frequency as that of the first signal and carries the same information, but is delayed in time by a conventional delay network 24.

The SFR 12 includes a receiver 26, a transmitter 28 and a cancellation circuit 30 for cancelling the signal generated by transmitter 28 as received by receiver 26 i.e. the spillover signal. The SFR preferably includes a horizontally polarized antenna 32 coupled to receiver 26 for receiving the first signal broadcast by the base station. A vertically polarized omnidirectional antenna 34 is coupled to transmitter 28 and broadcasts a third signal which carries the same information, such as audio or data, as carried by the first signal. Thus, the third signal consists of the first signal as received at antenna 32 delayed by a time interval T which is inherent in the processing and retransmitting of the signal by the SFR.

The delay network 24 is adjusted to provide a delay of T seconds so that the second signal transmitted from antenna 22 arrives at receiving antenna 32 of the SFR delayed in time by T relative to the arrival of the first signal. The spillover signal from transmitter antenna 34 also arrives at antenna 32 delayed in time by T relative to the first signal. Thus, a cancellation circuit 30 which is adjusted to cancel the spillover signal will also cancel the second signal as received by antenna 32 since the second signal at antenna 32 and the spillover signal are approximately in phase with each other. Thus, the second signal is cancelled leaving the desired signal (the first signal) to modulate the transmitter 28.

The time or phase difference between the second signal as transmitted from vertically polarized antenna 22 and the third signal as transmitted from antenna 34 is equal to the propagation delay from the base station to the SFR. For the mobile unit 14 to experience simulcast distortion due to the reception of the second and third signals, these signals must have approximately equal magnitude and have a time delay of 100 microseconds or longer relative to each other. Thus, the propagation time between the base station and the SFR is preferably limited to 100 microseconds or less. Assuming a propagation speed of five microseconds per mile, the distance between the base station and SFR distance is limited to approximately 20 miles in order to limit the delay between the second and third signals to 100 microseconds.

The following illustrative examples assume a base station to SFR distance of 20 miles. When the mobile unit 14 is closer to the SFR than to the base station, it will take the second signal longer to propagate from antenna 22 to the mobile than for the third signal to propagate from antenna 34 to the mobile. Hence, the mobile unit will receive the third signal delayed in time less than 100 microseconds relative to the second signal. When the mobile unit is equidistant between the base station and the SFR, it will take the second signal the same time to propagate from antenna 22 to the mobile as for the third signal to propagate from antenna 34 to the mobile. Hence the mobile unit will receive the third signal 100 microseconds after the reception of the second signal. When the mobile unit is closer to the base station than to the SFR, the propagation delay of the third signal from antenna 34 to the mobile will be greater than that of the second signal from antenna 22 to the mobile. Thus, the mobile will receive the third signal delayed in time by more than 100 microseconds relative to the second signal. Although the latter example could possibly result in simulcast distortion since the signals arrive time delayed by more than 100 microseconds, it is unlikely that simulcast distortion will result because the magnitude of the second signal will be greater than that of the third signal assuming equal effective radiated power by antenna 22 and 34.

It is assumed that mobile unit 14 has a conventional vertically polarized antenna 36 and will receive at least one of the vertically polarized signals transmitted from antenna 22 and 34 at a substantially greater magnitude than that of the horizontally polarized first signal. Assuming that attenuator 20 is adjusted such that the first signal is approximately 15 db below that of the second signal, the first signal should be received by mobile unit 14 at a magnitude sufficiently below one of the vertically polarized signals such that simulcast distortion will not result due to the reception of the first signal. Of course, the mobile unit 14 having a vertically polarized antenna 36 achieves a degree of isolation from the horizontally polarized first signal due to the orthogonal polarization difference.

If the horizontally polarized first signal is 15 db below the vertically polarized second signal, the first signal will be received by antenna 32 at the SFR approximately 5 db above that of the first signal assuming 20 db of isolation is provided against vertically polarized signals by horizontally polarized antenna 32. Thus, the first signal will be received by receiver 26 of the SFR with a magnitude approximately 5 db greater than that of the second signal. The effect of receiving such a second signal in an FM system is to cause the generation of additional side bands on the third signal broadcast by transmitter 28, that is, modulation components due to the second signal will be present in addition to desired modulation components due to the first signal. Of course, the generation of unwanted modulation components is not desired. If the second signal is received by receiver 26 in phase with the spillover signal from antenna 34, a cancellation circuit 30 can provide substantial cancellation of both. One such cancellation circuit is disclosed in U.S. Pat. No. 3,938,153 also see United Kingdom patent application GB2 No., 065,421 published June 24, 1981.

Figure two is a partial block diagram of SFR 12 illustrating an embodiment of cancellation circuit 30. In this illustrative embodiment the cancellation circuit forms an integral part of the receiver of the SFR. A sampling means 38, such as a directional coupler, samples a portion of the third signal from transmitter 28 and couples same as an input to mixer 40. The output from a local oscillator 42 provides the other input to mixer 40. The resulting output product 44 from mixer 40 provides one input to mixer 46. The signals received from antenna 32 provide the other input to mixer 46. The output product 48 from mixer 46 is coupled to a correlation and cancellation circuit 50 which is commonly referred to $C^2$ circuit. The output of oscillator 42 also provides an input to circuit 50. The general purpose of circuit 50 is to cancel the carrier frequency component of the spillover signal. A detailed explanation of the cancellation process is provided by the following mathematical terms.

The first, second, and third signals as received by receiver 26 are represented as terms (1), (2) and (3) respectively, as follows:

$$A \cos(wt + B \sin w_1 t) \quad (1)$$

$$C \cos[w(t+t_1) + B \sin w_1(t+t_1)] \quad (2)$$

$$D \cos[w(t+t_2) + B \sin w_1(t+t_2)] \quad (3)$$

where w is the carrier frequency, $w_1$ is the modulating frequency $t_1$ is the time delay of delay network 24, and $t_2$ is the rebroadcast time delay of the SFR. The input signal 44 to mixer 46 which is derived from a sample signal of the third signal is represented as:

$$E \cos[(w-w_2)t + wt_2 + B \sin w_1(t+t_2)] \quad (4)$$

where $w_2$ is the frequency of local oscillator 42.

The output 48 of mixer 46 represents the first, second, and third signals at an intermediate frequency represented respectively as terms (5), (6) and (7) as follows:

$$AE/2 \cos(w_2 t - wt_2 - Bw_1 t_2 \cos w_1 t) \quad (5)$$

$$CE/2 \cos[w_2 t + w(t_1 - t_2) + Bw_1(t_1 - t_2) \cos w_1 t] \quad (6)$$

$$DE/2 \cos w_2 t \quad (7)$$

The correlation and cancellation circuit 50 substantially cancels the unmodulated IF carrier frequency component which corresponds to the spillover signal, that is, term (7). Thus, the output 52 of circuit 50 consists of signals represented by terms (5) and (6). The undesired modulation component (the $\cos w_1 t$ term) in (6) due to the second signal is cancelled, i.e. becomes zero, when $t_1$ equals $t_2$. This condition occurs when the delay network 24 causes the second signal to be delayed for a time T which is equal to the rebroadcaast time delay of the SFR. It has been determined that no substantial undesired sidebands are generated on the third signal due to the modulation component in term (6) when the time delay of delay network 24 is adjusted such that $(t-t_1)$ attenuates the magnitude of the undesired modulation component by at least 10 db. When the delay network 24 is adjusted to within 20 microseconds of the delay of the SFR, 10 db attenuation of the undesired modulation component is obtained. Increasing unwanted sideband attenuation increases as the time differential between the delay of network 24 and the delay of the SFR decreases. Assuming this requirement is met, only the desired modulation component in term (5) which corresponds to the first signal is present at output 52 from circuit 50. This desired modulation component is utilized to modulate the third signal broadcast by transmitter 28.

FIG. 3 illustrates an alternative embodiment of a system according to the present invention in which two SFR's are utilized to provide an extended area of talkout coverage from a base station. Contrasting the system of FIG. 3 to that of FIG. 1, it will be apparent that an additional SFR 54 is employed. The SFR 54 includes a horizontally polarized receiving antenna 56 for receiving the first signal transmitted from the base station antenna 18 and includes a vertically polarized antenna 58 for retransmitting the received signal to mobile or portable units. This SFR operates on the same frequency and has the same rebroadcast time delay as that of SFR 12. This system operates in the same manner as the system of FIG. 1, that is, a cancellation circuit in each SFR cancels the spillover signal and the second signal transmitted by antenna 22 leaving only the desired second signal transmitted by antenna 18 to be received and retransmitted by the respective transmitting antennas of the SFR's.

However, a system utilizing two or more SFR's gives rise to an additional consideration which is not present in a system having only a single SFR. Where several SFR's are utilized, it is possible that each SFR will receive one or more retransmitted signals from the other SFR's in addition to the first and second signals transmitted by the base station. In order to prevent each SFR from transmitting undesired sidebands or modulation components corresponding to signals received from the other SFR's, each SFR should include a cancellation circuit capable of cancelling each of the undesired signals from the other SFR's.

FIG. 4 illustrates an embodiment of SFR 54 which includes a cancellation circuit means capable of cancelling the third signal received from SFR 12 in addition to cancelling the spillover signal from antenna 58 and the undesired vertically polarized second signal from antenna 22 of base station 10. The desired first signal transmitted from antenna 18 of the base station is received processed and retransmitted by antenna 58 of SFR 54.

The signals received by antenna 56 are passed by bandpass filter 60 to mixer 62. A first injection generator 64 provides a receiver first injection signal 66 to mixer 62. The resulting difference product 68 produced by mixer 62 is selected by bandpass filter 70 and applied to a cancellation and correlation circuit 72. The output 74 of circuit 72 provides one input to mixer 76 with the other input 78 consisting of the output of a second injection generating means 80. The difference output 82 from mixer 76 is selected by bandpass filter 84 and applied to correlation and cancellation circuit 86. The output 88 from circuit 86 provides one input to mixer 90 with the other input 92 consisting of the output of a third injection generating means 94. The resulting sum product 96 from mixer 90 is passed by bandpass filter 98 to an audio recovery circuit 100 which recovers the audio or other information carried by the desired signal and modulates transmitter 102 with same.

In the following table, each mathematical expression is identified by a primed member and represents a signal referenced in figure four by the corresponding number.

TABLE

| | |
|---|---|
| 59' | $A \cos(wt + \phi_a) + B \cos(wt + \phi_b) + C \cos(wt + \phi_c)$ |
| 66' | $D \cos(w_1 t + \phi_b)$ |
| 68' | $\dfrac{BD}{2} \cos w_2 t + \dfrac{AD}{2} \cos(w_2 t + \phi_a - \phi_b) +$ |

TABLE-continued

| | |
|---|---|
| | $\frac{CD}{2} \cos(w_2 t + \phi_c - \phi_b)$ |
| 74' | $\frac{AD}{2} \cos(w_2 t + \phi_{a-b}) +$ |
| | $\frac{CD}{2} \cos(w_2 t + \phi_c - \phi_b)$ |
| 78' | $E \cos(w_3 t + \phi_c - \phi_b)$ |
| 82' | $\frac{CDE}{4} \cos(w_4 t) +$ |
| | $\frac{ADE}{4} \cos(w_4 t + \phi_a - \phi_c)$ |
| 88' | $\frac{ADE}{4} \cos(w_4 t + \phi_a - \phi_c)$ |
| 92' | $F \cos(w_5 t + \phi_c)$ |
| 96' | $\frac{ADEF}{8} \cos(w_6 t + \phi_a)$ |
| 103' | $G \cos(wt + \phi_b)$ |

Four received FM signals are represented by expression 59' wherein: the first desired signal transmitted from base station antenna 18 has a magnitude of A and carries modulation as phase component $\phi_a$; the undesired spillover signal has a magnitude of B and a modulation component represented by $\phi_b$, the signal transmitted from SFR 12 by antenna 34 has a magnitude of C and a modulation component represented by $\phi_c$. Since the horizontially polarized signal transmitted from base station antenna 22 is phase coherent with the spillover signal of SFR 54 at antenna 56, the term $B \cos(wt + \phi_b)$ maybe considered as representing both signals.

The first, second, and third injection signals represented respectively as expressions 66', 78' and 92' each carry at least one modulation component which is in phase with one of the undesired modulation components, that is, $\phi_b$ or $\phi_c$. Each of the three modulation components represented in expression 59' differ only in that each has a different phase relationship with respect to the other components. Since the output signal represented by expression 103' from transmitter 102 carries modulation component $\phi_b$, the other undesired modulation component $\phi_c$ an be derived by time delaying a sample of the transmitter output signal such that $\phi_b$ is shifted to have a phase equal to that of $\phi_c$. For example, expression 78' can be derived as a mixing product from one signal carrying modulation component $\phi_b$ and another signal carrying modulation component $\phi_c$.

The difference mixing product 68' having an IF of $w_2$ results from the mixing of the received signal 59' and first receiver injection 66'. The correlation and cancellation circuit 72 cancels the unmodulated carrier frequency component from expression 68' resulting in output signal 74'. The difference mixing product resulting in an IF of $w_4$ is produced by mixing the second injection signal 78' with the previous IF signal 74'. The correlation and cancellation circuit 86 cancels the unmodulated IF carrier frequency component ($w_4$) from expression 82' resulting in signal 88'. The sum mixing product 96' results from the mixing of the IF signal 88' with the third receiver injection signal 92'. It will be observed that expression 96' represents a sinusoidal signal carrying only modulation component $\phi_a$, the desired modulation component. Thus, the undersired signals represented by the second and third terms in expression 59' have been cancelled so that the signal 103' transmitted by transmitter 102 consists of a carrier frequency having only the modulation component $\phi_b$ which is phase coherent with the modulation component of the signal transmitted by base station vertically polarized antenna 22 as received at antenna 56.

From the above description it will be apparent that the spillover signal, the second signal transmitted from the base station, and the retransmitted signal by SFR 12 has been cancelled by SFR 54. In order to prevent unwanted modulation products from being retransmitted by an SFR, each SFR should be capable of cancelling any received undesired signals from other SFR's.

Although, only two SFR's are shown in the illustrative system of FIG. 3 the present invention contemplates that more than two SFR's could be utilized in a simulcast communication system. In light of the above teachings, it will be apparent to those skilled in the art that additional circuitry would have to be added to the specific embodiment illustrated in FIG. 4 to cancel each of the additional undesired received signals. For example, the addition of circuitry similar to circuitry 104 would have to be added to cancel each additional undesired signal. It will also be apparent that each of the injection generators should be selected to carry modulation components to cancel corresponding modulation components carried in one of the terms of the IF signal which will be mixed with the injection signal. Thus, an additional injection signal generator together with corresponding mixing and correlation and cancellation circuitry must be provided for each additonal undesired signal to be cancelled. Each injection generator is derived to carry a modulation component or components such that one of the resulting mixing products will have its modulation component cancelled leaving only a carrier frequency component to be subsequently cancelled by a following cancellation correlation circuit.

The simulcast SFR system contemplated by the present invention conserves frequency spectrum by utilizing one or more SFR's to rebroadcast a received signal on the same frequency. Delaying the signal transmitted from the base station to the mobile units relative to a signal transmitted to the SFR's by a time period equal to the rebroadcast delay associated with each SFR enables cancellation circuitry in each SFR to cancel the spillover signal and the time delayed signal broadcast by the base station. The likelihood of a mobile unit experiencing simulcast distortion is minimized since the signal rebroadcast by each SFR differs in phase from the signal transmitted by the base station to the mobile units by only the propagation delay between the base station and the SFR. Where two or more SFR's are utilized in a simulcast system wherein each SFR may receive the output signal from another SFR, each SFR additionally includes cancellation circuitry for cancelling the undesired received signals from the other SFR's.

Although, embodiments of the present invention have been described above and illustrated in the drawings, the scope of the present invention is defined by the claims appended hereto.

What is claimed is:

1. In a simulcast communication system including a transmitting station for transmitting a first signal at a given frequency and a same frequency repeater (SFR) for receiving the first signal and for retransmitting the received signal at the given frequency, the SFR having a time delay of T such that the signal transmitted by the transmitter of the SFR consists of said received signal delayed in time by T, said retransmitted signal as received by the receiver of the SFR defining a spillover signal, the improvement: comprising:
   a. means coupled to the transmitting station for generating a second signal derived by time delaying said first signal in time by approximately T so that said second signal and said spillover signal are in phase with each other at the SFR receiver; and
   b. means coupled to said SFR for substantially cancelling said spillover signal, said second signal and said spillover signal being received in phase with each other by said SFR such that the second signal and the spillover signal are substantially cancelled by said cancelling means.

2. The communication system according to claim 1 wherein said generating means includes a delay network having a delay interval of T.

3. The communication system according to claim 1 wherein said second signal has a carrier frequency component and a modulation component, and wherein said cancelling means includes one means for cancelling the carrier frequency component of said second signal and another means for cancelling the modulation component carried by said second signal.

4. The communication system according to claim 1 further comprising a first antenna means for transmitting said first signal with a given polarization, and a second antenna means for transmitting said second signal with a polarization orthogonal to the polarization of said first signal.

5. The communication system according to claim 4 further comprising gain controlling means for controlling the magnitude of the first and second signals as received by said SFR such that said first signal is received with a magnitude greater than said second signal.

6. The communication system according to claim 4 wherein said first antenna means includes a horizontally polarized antenna and said second antenna means includes a vertically polarized antenna.

7. The communication system according to claim 1 wherein said generating means generates said second signal with a time delay which differs from the time delay T of said SFR by less than 20 microseconds whereby said cancelling means provides substantial cancellation of said second signal as well as said spillover signal.

8. A method for utilizing a same frequency repeater (SFR) in a simulcast communication system having a transmitting station, said method comprising the steps of:
   a. transmitting a first signal at a given frequency from said transmitting station;
   b. said SFR receiving said first signal;
   c. said SFR retransmitting the received signal at the given frequency after a time delay of T;
   d. said SFR receiving said retransmitted signal as a spillover signal;
   e. transmitting a second signal from said transmitting station, said second signal consisting of said first signal delayed in time by T1 which is approximately equal to T;
   f. said SFR receiving said second signal; and
   g. cancelling signals received by the SFR which are substantially in phase with said spillover signal, whereby said second signal and said spillover signal are substantially cancelled since said second signal is substantially in phase with said spillover signal.

9. The method according to claim 8 further comprising the step of generating said second signal by time delaying said first signal for a time period of T1.

10. The method according to claim 8 wherein said spillover signal has a carrier frequency component and a modulation component, and further comprising the steps of cancelling the carrier frequency component of said spillover signal and cancelling the modulation component carried by said spillover signal.

11. The method according to claim 8 further comprising the step of controlling the magnitude of the first signal as received by the SFR relative to the magnitude of said second signal as received by said SFR such that said first signal is greater in magnitude than said second signal.

12. The method according to claim 8 further comprising the step of controlling the time delay of T1 relative to T such that the difference is less than 20 microseconds.

13. The method according to claim 8 further comprising the step of transmitting said second signal with a polarization which is orthogonal to the polarization of said first signal.

14. In a simulcast communication system including a transmitting station for transmitting a first signal at a given frequency, a first and second same frequency repeater (SFR) each having a receiver for receiving said first signal and a transmitter for retransmitting the received signal at said given frequency, each SFR having a time delay of T such that each retransmitted signal consists of said received signal delayed in time by T, each SFR receiver receiving a spillover signal consisting of the signal retransmitted by each corresponding SFR, the improvement comprising:
   a. means coupled to the transmitting station for generating a second signal consisting of said first signal delayed in time by T1 which is approximately equal to T;
   b. first means associated with each SFR for substantially cancelling said spillover signal, said second signal and said spillover signal being received in phase with each other by each SFR such that the second signal and the spillover signal are substantially cancelled by the first cancelling means; and
   c. second means coupled to said first SFR for substantially cancelling the retransmitted signal by said second SFR as received by said first SFR whereby said retransmitted signal by said first SFR does not contain any substantial components of the signal retransmitted by said second SFR.

15. The communication system according to claim 14 further comprising a third means associated with said second SFR for substantially cancelling the retransmitted signal by said first SFR as received by said second SFR, whereby the signal retransmitted by said second SFR does not contain any substantial components of the signal retransmitted by said first SFR.

* * * * *